(12) United States Patent
Herzi

(10) Patent No.: US 6,754,722 B2
(45) Date of Patent: Jun. 22, 2004

(54) SYSTEM AND METHOD FOR INSTALLING DEVICE DRIVERS IN A COMPUTER SYSTEM

(75) Inventor: Dirie Herzi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 426 days.

(21) Appl. No.: 09/726,112

(22) Filed: Nov. 29, 2000

(65) Prior Publication Data

US 2002/0095526 A1 Jul. 18, 2002

(51) Int. Cl.[7] .................................................. G06F 3/00
(52) U.S. Cl. ............................ 710/8; 710/104; 710/9; 710/10; 713/1; 713/2; 709/220; 709/221; 709/222
(58) Field of Search ............... 710/8–14; 709/220–226; 713/1, 2

(56) References Cited

U.S. PATENT DOCUMENTS

| | | | |
|---|---|---|---|
| 5,598,563 A | * | 1/1997 | Spies .............................. 713/2 |
| 5,657,457 A | | 8/1997 | Gaskins |
| 5,787,246 A | * | 7/1998 | Lichtman et al. ............ 709/220 |
| 5,974,474 A | * | 10/1999 | Furner et al. .................. 710/8 |
| 5,978,856 A | | 11/1999 | Jones |
| 6,473,854 B1 | * | 10/2002 | Fleming, III .................... 713/1 |

\* cited by examiner

Primary Examiner—Jeffrey Gaffin
Assistant Examiner—Mike Nguyen
(74) Attorney, Agent, or Firm—Haynes and Boone, LLP

(57) ABSTRACT

A system and method for installing device drivers in a computer system is provided. The method is performed by a computer system and includes identifying a first driver and a second driver to be installed in the computer system according to information accessible by the computer system. The method further includes installing the first driver in response to a first device associated with the first driver being present in the computer system, and installing the second driver in response to a second device associated with the second driver being present in the computer system.

21 Claims, 4 Drawing Sheets

SYSTEM AND METHOD FOR INSTALLING DEVICE DRIVERS IN A COMPUTER SYSTEM

BACKGROUND

The disclosures herein relate generally to computer systems and more particularly to a system and method for installing device drivers.

A computer system includes a variety of devices that perform a variety of functions. These devices use software known as a driver or device driver to operate and interact with the processor and other devices in the computer system. The devices in a computer system, as well as drivers associated with the devices, often come from a variety of manufacturers. Different device vendors typically provide different wrappers, i.e. applications used to install drivers, to allow their drivers to be installed onto the computer system. The look and feel of the wrappers are often different because they come from different vendors.

The differences in wrappers provided by different vendors may cause difficulties or delays in manufacturing a computer system. The manufacturer of the computer system may need to expend additional resources to accommodate the different wrappers provided for differing devices in a computer system. In addition, a vendor may delay the development of a wrapper or omit the wrapper altogether.

A user of a computer system may also encounter difficulties in installing or upgrading a driver in his or her computer system. These difficulties may be increased by the differing look and feel of driver wrappers from different vendors and may result in the user calling the vendor of the computer system for technical support. It would be desirable to reduce the number of difficulties a user encounters in installing device drivers in a computer system.

Therefore, what is needed is a system and method for installing device drivers in a computer system.

SUMMARY

One embodiment, accordingly, provides a method performed by a computer system. The method includes identifying a first driver and a second driver to be installed in the computer system according to information accessible by the computer system. The method further includes installing the first driver in response to a first device associated with the first driver being present in the computer system, and installing the second driver in response to a second device associated with the second driver being present in the computer system.

A principal advantage of this embodiment is that it provides a user or computer manufacturer with the ability to install, upgrade, and manage device drivers from different vendors in a computer system. The user or computer manufacturer has the ability to select drivers for installation and upgrade in a uniform manner. The computer system can ensure that the proper device drivers are installed and upgraded to reduce the potential for difficulties on the part of the user.

DETAILED DESCRIPTION

Figure 1:
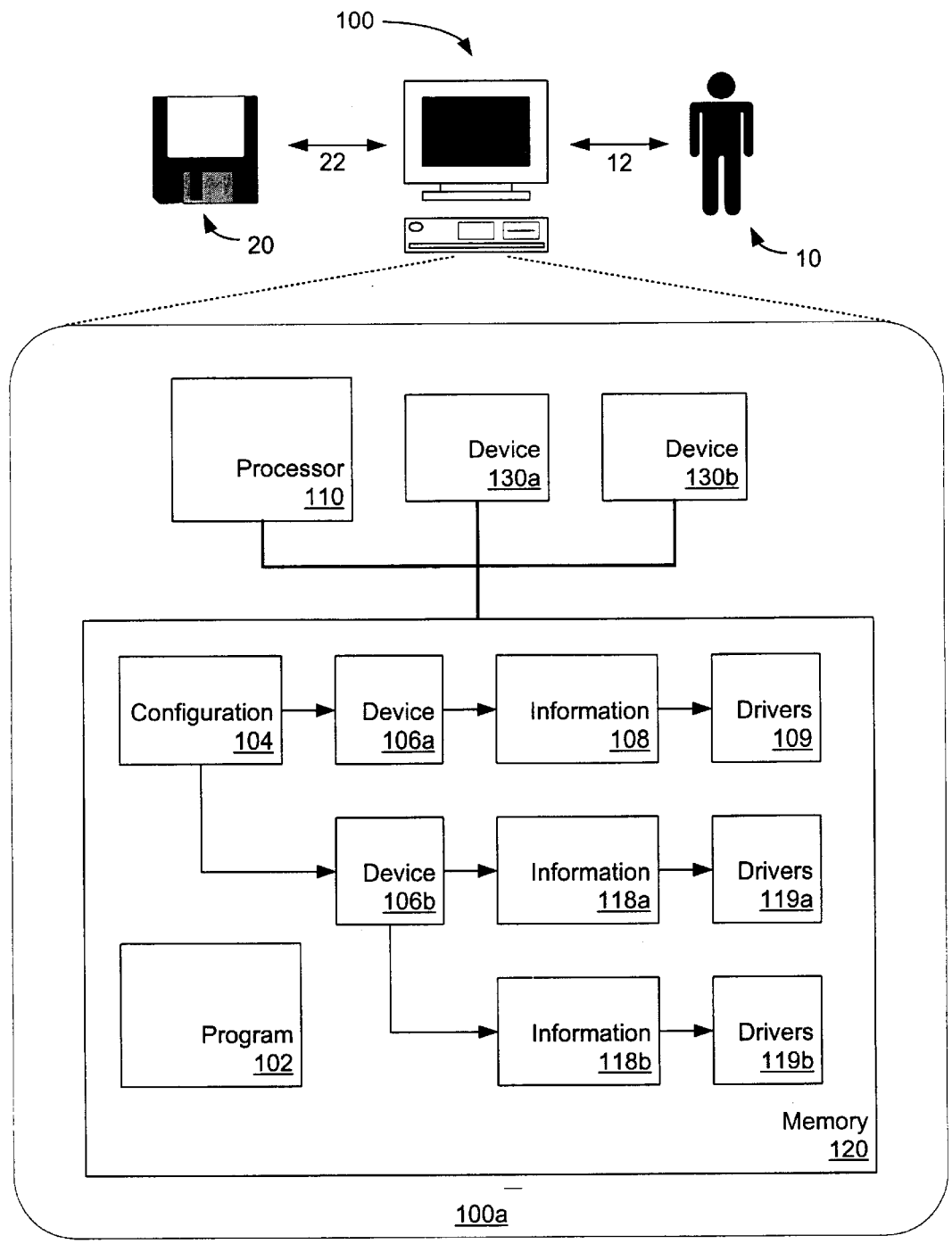
FIG. 1 is a diagram illustrating an embodiment of a computer system.

FIG. 1 is a diagram illustrating an embodiment of a computer system 100. Computer system 100 operates in association with inputs, indicated by an arrow 12, received from a human user 10. As indicated by a box 100a, computer system 100 includes a processor 110, a memory 120, a device 130a, and a device 130b. Memory 120 includes a program 102 that is configured to cause processor 110 to access information in a device configuration file 104, a plurality of device files 106a and 106b, a plurality of information files 108, 118a, and 118b, and a plurality of drivers 109, 119a, and 119b. Device configuration file 104, device files 106a and 106b, information files 108, 118a, and 118b, and drivers 109, 119a, and 119b may be stored on a hard disk drive or on a CD-ROM accessible using a CD-ROM drive in computer system 100 prior to being copied into memory 120.

Program 102 is loaded onto computer system 100 from a computer readable storage media 20 as indicated by an arrow 22. Media 20 may be a floppy disk, a CD-ROM drive, a hard disk drive, or other storage media. Program 102 operates in conjunction with an operating system of computer system 100. In one embodiment, the operating system is Windows 2000 from Microsoft Corporation. In other embodiments, other operating systems may be used.

Program 102 provides user 10 with the ability to install, upgrade, and manage device drivers in computer system 100. In computer system 100, devices, such as devices 130a and 130b, operate in conjunction with software known as drivers or device drivers. A driver generally operates only with a specific device from a specific vendor, i.e. different devices typically have different drivers. For devices 130a and 130b to operate correctly in computer system 100, the proper device driver for each needs to be installed.

In the embodiment shown in FIG. 1, program 102 causes information in device configuration file 104, device files 106a and 106b, information files 108, 118a, and 118b, and drivers 109, 119a, and 119b to be accessed and uses this information to cause the drivers for devices 130a and 130b and other devices (not shown) in computer system 100 to be installed. Program 102 is selectively operable to either automatically install the drivers or install the drivers in response to inputs from user 10.

Program 102 causes a determination to be made as to what drivers are available for installation or upgrade in computer system 100. In the embodiment of FIG. 1, program 102 causes configuration file 104 to be located and read. Configuration file 104 is located in a central directory location such as C:\DELL and includes information that is used by program 102 to locate device files 106a and 106b. The information in configuration file 104 may be a directory listing for each device file 106a and 106b. For example, configuration file 104 may include the following information:

--- dell\drivers\1405u\Dell_Video.ini
dell\drivers\1405u\Dell_Audio.ini
dell\drivers\1405u\Dell_NIC.ini

---

From this information, program 102 causes device files, such as device files 106a and 106b, to be located.

Device files 106a and 106b contain information regarding a driver or drivers to be used with specific devices. Program 102 causes these files to be read to identify drivers that may be installed in computer system 100. The information includes a name of the driver, a list of hardware identification codes, a location of an information file associated with the driver, and other information that may be used to trigger certain functions, such as a reboot of a computer system, associated with installing the driver. For example, device file 106a may include the following information:

```
[Name]
"3Com NC9XXX Network Driver";    // Name to be displayed
[Hardware Ids]
PCI\VEN_3333&DEV_0025&SUBSYS_0005405E;    // Hardware
PCI\VEN_5555&DEV_002D&SUBSYS_0001104E;    // Identification
PCI\VEN_1033&DEV_002D&SUBSYS_0001102E;    // Codes
PCI\VEN_1044&DEV_002D&SUBSYS_0001103E;
PCI\VEN_10DE&DEV_002D&SUBSYS_000110DE;
[Information File]
dell\drivers\1405u\smwdm.inf    // Location of driver information file
[Function Codes]
REBOOT;    // Computer system to reboot after installing the driver
```

Figure 3:
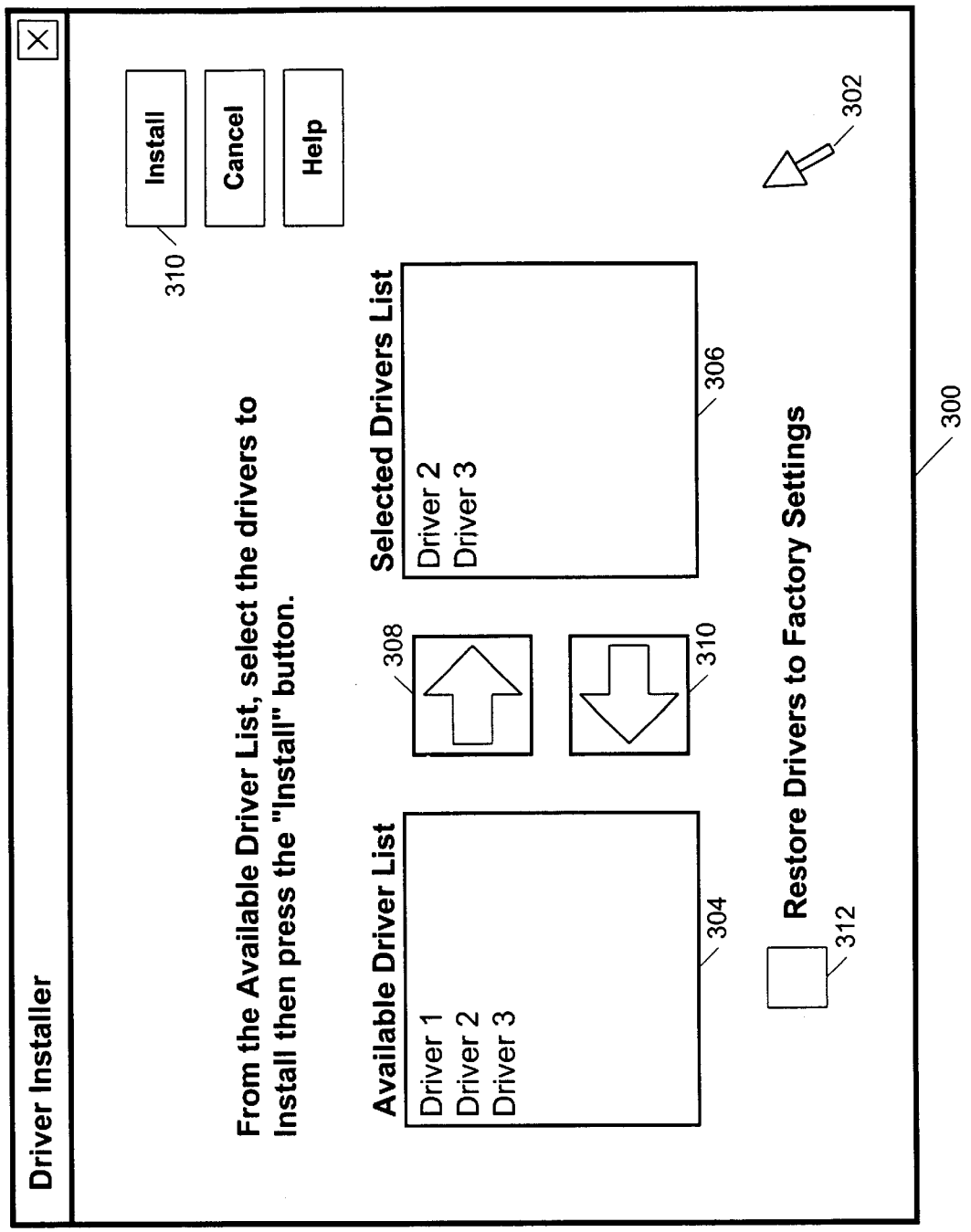
FIG. 3 is a diagram illustrating an embodiment of a menu window displayable by the computer system of FIG. 1.

The name of the driver is displayable to user 10 during the selection and/or installation of the driver and may be displayed in a menu window as illustrated in FIG. 3 described below. The hardware identification codes indicate devices with which the driver is compatible. The use of the hardware identification codes by program 102 is described below.

The information file identified by device file 106a or 106b includes information that program 102 uses to cause the driver to be installed. In FIG. 1, device file 106a refers to information file 108. Similarly, device file 106b refers to information file 118a and information file 118b. These information files 108, 118a, and 118b are associated with drivers 109, 119a, and 119b, respectively. The function codes are used by program 102 to initiate certain functions, such as a reboot of the computer system, in conjunction with the installation of the driver.

In an embodiment where computer system 100 operates using Windows 2000, device files 106a and 106b may be .INI files. In other embodiments, other file types may be used.

Program 102 causes information in information files 108, 118a, and 118b to be accessed to cause drivers 109, 119a, and 119b, respectively, to be installed. Information files 108, 118a, and 118b include information such as the location of drivers 109, 119a, and 119b, respectively, the location where to install the drivers, and information regarding the drivers themselves. In an embodiment where computer system 100 operates using Windows 2000, information files 108, 118a, and 118b may be .INF files and drivers 109, 119a, and 119b may be .CAT files. Alternatively, information files 108, 118a, and 118b and drivers 109, 119a, and 119b may be combined into .CAB files, respectively. In other embodiments, other file types may be used.

Program 102 causes one or more of drivers 109, 119a, and 119b to be installed in computer system 100. The selection of which drivers to install may be done automatically by program 102 in response to detecting which drivers are present in computer system 100. The selection of which drivers to install may also occur in response to inputs 12 from user 10 as described with respect to FIG. 3 below. A command line parameter may be supplied to program 102 to determine whether program 102 selects drivers automatically or with input from user 10.

In response to driver 109, 119a, or 119b being selected for installation, program 102 determines whether a device associated with the selected driver is present in computer system 100. Program 102 causes the hardware identification codes associated with the selected driver 109, 119a, or 119b to be compared to the hardware identification codes of the devices installed in computer system 100. The hardware identification codes may be read from device files 106a or 106b as described above, and they may also be read from information files 108, 118a, or 118b. The hardware identification codes associated with the selected driver 109, 119a, or 119b correspond to devices that are supported by the selected driver. If any of these devices is present in computer system 100, then the selected driver is installed if it is available. For example, if driver 109 is the selected driver and one of the hardware identification codes associated with driver 109 matches the hardware identification code of device 130a, then driver 109 is installed in computer system 100. If none of the devices that correspond to the hardware identification codes are present in computer system 100, then program 102 causes user 10 to be notified that the device is missing and the selected driver cannot be installed. For example, if driver 109 is the selected driver and none of the hardware identification codes associated with driver 109 matches the hardware identification code of device 130a, device 130b, or another device in computer system 100, then driver 109 is not installed in computer system 100. Program 102 may cause the notification to be accomplished by displaying a message on a display of computer system 100 or another display, or by writing this information to a log file.

In an embodiment where computer system 100 operates using Windows 2000, the function SetupDiEnumDeviceInfo may be called to obtain the hardware identification codes of devices present in computer system 100. In other embodiments, other methods may be used to obtain the hardware identification codes of devices present in computer system 100.

To install a selected driver 109, 119a, or 119b, program 102 causes a determination to be made as to whether the selected driver is available to be installed. Program 102 causes this determination to be made by searching for the information file 108, 118a, or 118b associated with the selected driver in the location specified by associated device file 106a or 106b. If the information file associated with the selected driver is found, then program 102 causes the selected driver to be installed. If the information file associated with the selected driver is not found, then program 102 does not cause the selected driver to be installed and causes user 10 to be notified. Program 102 may cause this notification to be accomplished by displaying a message on a display of computer system 100 or another display, or by writing this information to a log file.

In an embodiment where computer system 100 operates using Windows 2000, program 102 causes the selected driver to be installed using the function UpdateDriverForPlugAndPlayDevice. This function allows user 10 to force a driver install and block reboots. In other embodiments, program 102 causes the selected driver to be installed in other ways.

If any additional drivers 109, 119a, or 119b have been selected for installation, program 102 causes the next selected driver to be installed or not installed in the manner just described.

Following the installation of one or more of drivers 109, 119a, and/or 119b, program 102 causes a determination to be made as to whether computer system 100 needs to be rebooted. An indication as to whether a reboot is needed may be generated by one or more of installed drivers 109, 119a, and/or 119b or by a function code in one of device files 106a or 106b. If a reboot is indicated, then program 102 causes computer system 100 to be rebooted. If a reboot is not indicated, then program 102 does not cause computer system 100 to be rebooted.

In an embodiment where computer system 100 operates using Windows 2000, program 102 causes a reboot of computer system 100 by adjusting token privileges using the functions LookupPrivilegeValue and AdjustTokenPrivileges. Program 102 then causes a reboot using the function InitiateSystemShutdown. In other embodiments, other methods of rebooting computer system 100 may be used.

To add new drivers to computer system 100, the new drivers and any respective information and device files are copied to one or more directories on computer system 100. The directory locations are recorded in configuration file 104 to allow program 102 to locate the new drivers. In this way, program 102 does not need to be modified to support new drivers.

In FIG. 1, device configuration file 104, device files 106a and 106b, information files 108, 118a, and 118b, and drivers 109, 119a, and 119b are shown by way of example. Other embodiments may include other numbers of each type of file or may combine or separate information in these types of files. Further, information stored in device configuration file 104, device files 106a and 106b, information files 108, 118a, and 118b, and drivers 109, 119a, and 119b may be stored in other ways in other embodiments.

Figure 2A:
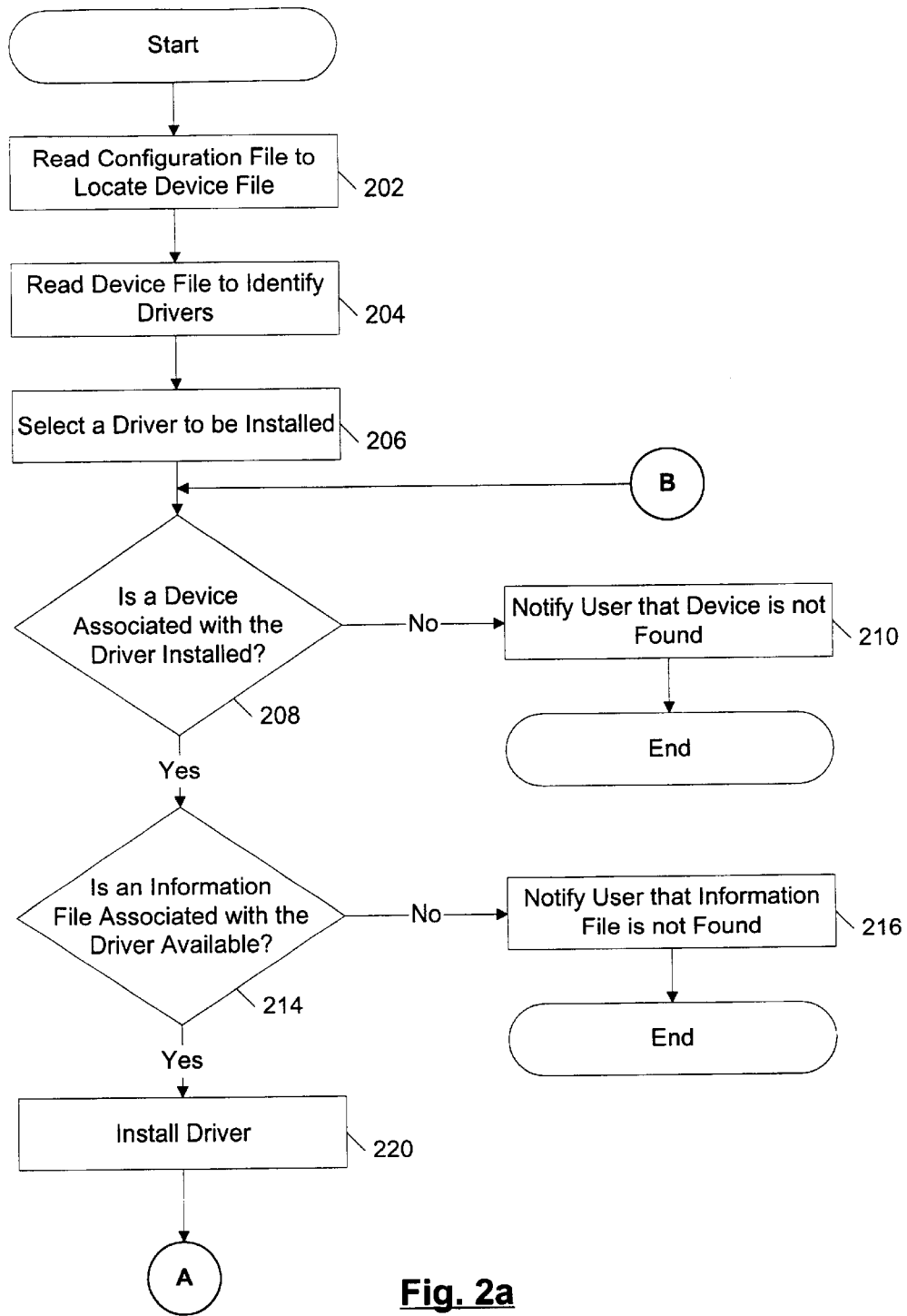
FIG. 2a is a first portion of a flowchart illustrating an embodiment of a method for installing device drivers.
Figure 2B:
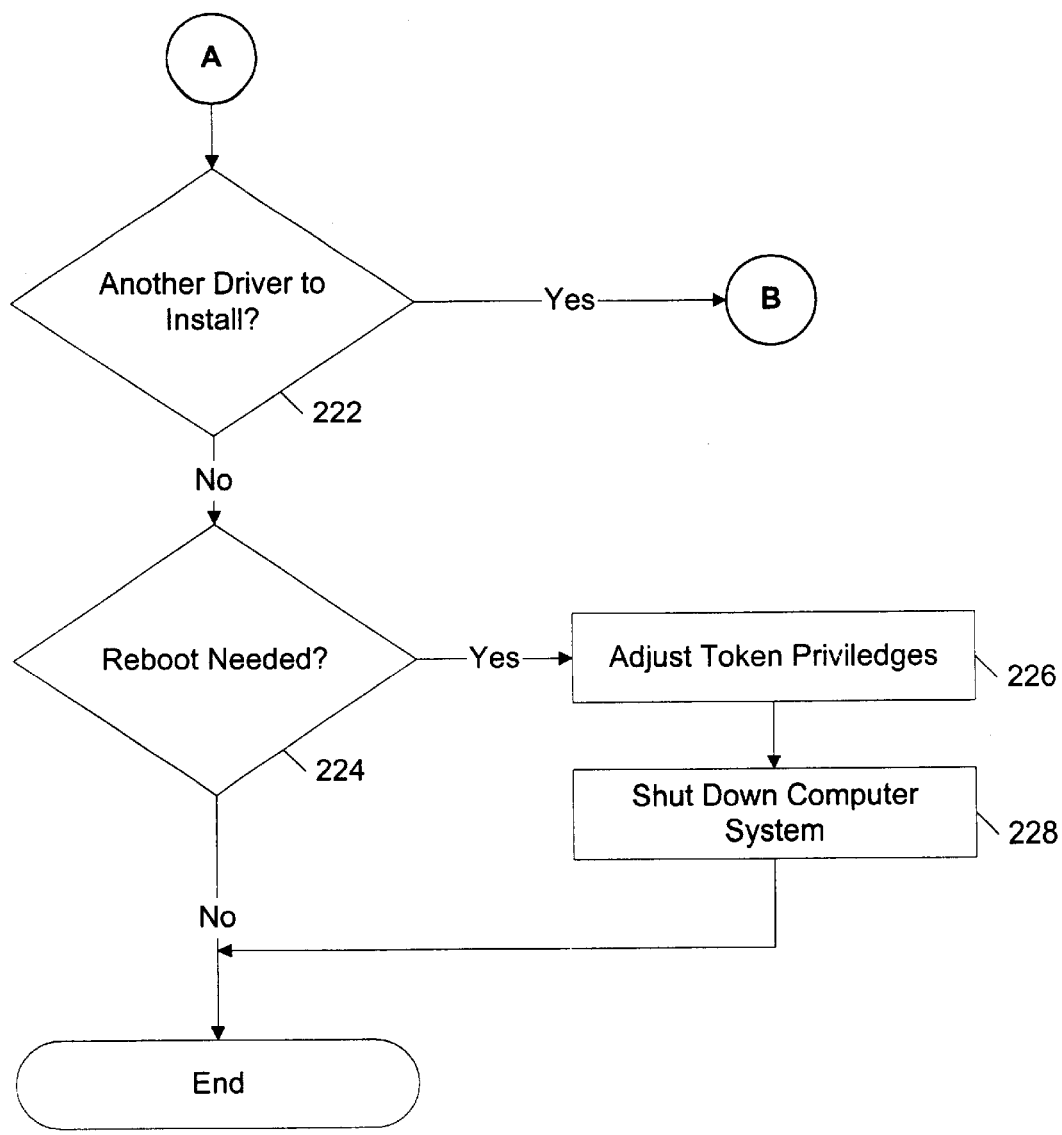
FIG. 2b is a second portion of a flowchart illustrating an embodiment of a method for installing device drivers.

FIG. 2a and FIG. 2b are a first portion and a second portion, respectively, of a flowchart illustrating an embodiment of a plurality of steps of a method performed by a computer system for installing device drivers. A configuration file is read to locate a device file as indicated in step 202. The device file is read to identify drivers that may be installed in computer system 100 as indicated in step 204. A driver to be installed may be selected as indicated in step 206. The driver may be selected automatically by a program or in response to a user input.

A determination is made as to whether a device associated with the driver is installed as indicated in step 208. If a device associated with the driver is not installed, then a user is notified that a device associated with the driver is not found as indicated in step 210 and the method terminates. If a device associated with the driver is installed, then a determination is made as to whether an information file associated with the driver is available as indicated in step 214. An information file associated with the driver is available if it is accessible by the computer system. If an information file associated with the driver is not available, then the user is notified that an information file associated with the driver is not found as indicated in step 216 and the method terminates. If an information file associated with the driver is found, then the driver is installed as indicated in step 220.

The flowchart continues at point A on FIG. 2b.

A determination is made as to whether another driver has been selected for installation as indicated in step 222. If another driver has been selected for installation, then the steps beginning with step 208 are repeated as indicated by point B on FIG. 2a and FIG. 2b.

If another driver has not been selected for installation, then a determination is made as to whether a reboot is needed as indicated in step 224. If a reboot is needed, then token privileges are adjusted as indicated in step 226 and the computer system is shut down as indicated in step 228. If a reboot is not needed, then the method terminates as shown.

FIG. 3 is a diagram illustrating an embodiment of a menu window 300 displayable by computer system 100 of FIG. 1.

Using menu window 300, user 10 selects one or more drivers to be installed in computer system 100 using a pointer 302. User 10 operates pointer 302 in conjunction with a mouse, a keyboard, or other input device of computer system 100 to select drivers for installation.

The names of divers available for installation, e.g. Diver 1, Driver 2, and Driver 3, are listed in a box 304. These drivers may be detected by using device files 106a and 106b as described above. User 10 selects the drivers to be installed by highlighting a driver name in box 304 and selecting a button 308. In response to selecting a driver in this way, the driver name appears in the selected drivers list in a box 306. User 10 may unselect or remove a driver from this list by highlighting the driver name and selecting a button 310. User 10 may also select a button 312 to cause the original factory drivers to be reinstalled.

In the example shown in FIG. 3, user 10 has selected Driver 2 and Driver 3 for installation. User 10 triggers the installation by selecting button 310. Computer system 100 may provide status notifications to user 10 during or after the process of installing the selected drivers.

In the embodiment of FIG. 3, the indicator used to represent a driver available for installation is a name associated with the driver. In other embodiments, a picture of a device associated with the driver or other indicator may be used.

The embodiment of FIG. 3 provides user 10 with a single user interface for installing, upgrading, and managing drivers for computer system 100. The embodiment also allows user 10 to restore factory default drivers by selecting a single button. In addition, by allowing multiple drivers to be selected for installation at one time, computer system 100 may not need to be rebooted until all of the selected drivers have been installed.

As can be seen, the principal advantages of these embodiments are that they provide a user or computer manufacturer with the ability to install, upgrade, and manage device drivers from different vendors in a computer system. The user or computer manufacturer has the ability to select drivers for installation and upgrade in a uniform manner. The computer system can ensure that the proper device drivers are installed and upgraded to reduce the potential for difficulties on the part of the user. With the reduced difficulties, a user may not need to contact a vendor of the computer system for technical support or may need less assistance from the vendor to solve driver related problems. In addition, a computer manufacturer may more easily integrate the installation of drivers from different vendors into a manufacturing environment to reduce the cycle time for delivery of new products.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by a computer system comprising:
copying new drivers and respective information and device files to one or more directories in the computer system;
recording location of the directories in a configuration file;
accessing information, via a program, to identify a compatible driver for a specific device in the system;

identifying a first driver and a second driver to be installed in the computer system according to first information accessible by the computer system;

determining driver availability for installation;

installing the first driver in response to a first device associated with the first driver being present in the computer system; and installing the second driver in response to a second device associated with the second driver being present in the computer system, whereby the program does not require modification to support the new drivers.

2. The method of claim 1, further comprising:

displaying a first indicator associated with the first driver and a second indicator associated with the second driver to a user in response to identifying the first driver and the second driver;

selecting the first driver for installation in response to a first input from the user; and selecting the second driver for installation in response to a second input from the user.

3. The method of claim 1, further comprising:

notifying a user of the computer system in response to the first device or the second device not being present in the computer system.

4. The method of claim 1, further comprising:

detecting second information associated with the first driver; and detecting third information associated with the second driver.

5. The method of claim 4, further comprising:

installing the first driver in accordance with the second information; and installing the second driver in accordance with the third information.

6. The method of claim 4, further comprising:

notifying a user in response to failing to detect the second information; and notifying the user in response to failing to detect the third information.

7. The method of claim 1, further comprising:

detecting a request to reboot the computer system in response to installing the first device and the second device; and causing the computer system to be rebooted in response to detecting the request.

8. A computer system comprising:

new drivers and respective information and device files stored in a directory in the computer system;

a configuration file including location of the directory;

a memory configured to store a program; and a processor coupled to the memory and configured to execute the program;

the program including instructions for causing the computer system to:

identify a compatible driver for a specific device in the system;

identify a first driver and a second driver to be installed in the computer system according to first information accessible by the computer system;

determine driver availability for installation;

install the first driver in response to a first device associated with the first driver being present in the computer system; and install the second driver in response to a second device associated with the second driver being present in the computer system, whereby the program does not require modification to support the new drivers.

9. The computer system of claim 8, wherein the program further includes instructions for causing the computer system to:

display a first indicator associated with the first driver and a second indicator associated with the second driver to a user in response to identifying the first driver and the second driver;

select the first driver for installation in response to a first input from the user; and select the second driver for installation in response to a second input from the user.

10. The computer system of claim 8, wherein the program further includes instructions for causing the computer system to:

notify a user of the computer system in response to the first device or the second device not being present in the computer system.

11. The computer system of claim 8, wherein the program further includes instructions for causing the computer system to:

install the first driver in response to detecting second information associated with the first driver; and install the second driver in response to detecting third information associated with the second driver.

12. The computer system of claim 11, wherein the program further includes instructions for causing the computer system to:

install the first driver in accordance with the second information; and install the second driver in accordance with the third information.

13. The computer system of claim 11, wherein the program further includes instructions for causing the computer system to:

notify a user in response to failing to detect the second information; and notify the user in response to failing to detect the third information.

14. The computer system of claim 8, wherein the program further includes instructions for causing the computer system to:

detect a request to reboot the computer system in response to installing the first device and the second device; and reboot the computer system in response to detecting the request.

15. A computer program product comprising:

a computer program for causing a computer system to:

identify a compatible driver from a directory of new drivers in the computer system for a specific device in the system, the directory having location included in a configuration file;

identify a first driver and a second driver to be installed in the computer system according to first information accessible by the computer system;

determine driver availability for installation;

install the first driver in response to a first device associated with the first driver being present in the computer system; and install the second driver in response to a second device associated with the second driver being present in the computer system; and an apparatus from which the computer program is accessible by the computer system, whereby the program does not require modification to support the new drivers.

16. The computer program product of claim 15. the computer program processable by the computer system for causing the computer system to:

display a first indicator associated with the first driver and a second indicator associated with the second driver to a user in response to identifying the first driver and the second driver;

select the first driver for installation in response to a first input from the user; and select the second driver for installation in response to a second input from the user.

17. The computer program product of claim 15, the computer program processable by the computer system for causing the computer system to:

notify a user of the computer system in response to the first device or the second device not being present in the computer system.

18. The computer program product of claim 15, the computer program processable by the computer system for causing the computer system to:

install the first driver in response to detecting second information associated with the first driver; and install the second driver in response to detecting third information associated with the second driver.

19. The computer program product of claim 18, the computer program processable by the computer system for causing the computer system to:

install the first driver in accordance with the second information; and install the second driver in accordance with the third information.

20. The computer program product of claim 18, the computer program process able by the computer system for causing the computer system to:

notify a user in response to failing to detect the second information; and notify the user in response to failing to detect the third information.

21. The computer program product of claim 15, the computer program process able by the computer system for causing the computer system to:

detect a request to reboot the computer system in response to installing the first device and the second device; and reboot the computer system in response to detecting the request.

* * * * *